(12) United States Patent
Suutari

(10) Patent No.: US 10,252,191 B2
(45) Date of Patent: Apr. 9, 2019

(54) METHOD FOR AIR DRYING A FILTER CAKE AND FILTER PLATE

(71) Applicant: OUTOTEC (FINLAND) OY, Espoo (FI)

(72) Inventor: Teppo Suutari, Heituinlahti (FI)

(73) Assignee: OUTOTEC (FINLAND) OY, Espoo (FI)

( * ) Notice: Subject to any disclaimer, the term of this patent is extended or adjusted under 35 U.S.C. 154(b) by 484 days.

(21) Appl. No.: 14/768,312

(22) PCT Filed: Feb. 18, 2014

(86) PCT No.: PCT/FI2014/050120
§ 371 (c)(1),
(2) Date: Aug. 17, 2015

(87) PCT Pub. No.: WO2014/128350
PCT Pub. Date: Aug. 28, 2014

(65) Prior Publication Data
US 2015/0360149 A1 Dec. 17, 2015

(30) Foreign Application Priority Data

Feb. 19, 2013 (FI) ..................................... 20135149

(51) Int. Cl.
*B01D 25/28* (2006.01)
*B01D 25/12* (2006.01)
*B01D 25/164* (2006.01)

(52) U.S. Cl.
CPC ........... *B01D 25/284* (2013.01); *B01D 25/12* (2013.01); *B01D 25/164* (2013.01)

(58) Field of Classification Search
None
See application file for complete search history.

(56) References Cited

U.S. PATENT DOCUMENTS 1,993,175 A * 3/1935 Libbey et al. ......... B01D 35/12
 210/333.01
4,285,821 A * 8/1981 Hiesinger .............. B01D 37/02
 210/777

(Continued)

FOREIGN PATENT DOCUMENTS

CN 201076786 Y 6/2008
CN 101380527 A 3/2009

(Continued)

OTHER PUBLICATIONS

International Search Report (PCT/ISA/210) dated Jun. 5, 2014, by the Finnish Patent Office as the International Searching Authority for International Application No. PCT/FI2014/050120.

(Continued)

*Primary Examiner* — Robert J Popovics
(74) *Attorney, Agent, or Firm* — Buchanan, Ingersoll & Rooney PC

(57) ABSTRACT

A method for air drying a filter cake contained in a filter chamber defined by a first filter plate, which comprises an air inlet for supplying drying air into the filter chamber to expel fluids from the filter cake, and a second filter plate, which comprises a fluid outlet for discharging fluids from the filter chamber. The method comprises throttling the air flow into the filter chamber by means of an orifice plate that acts as a flow resistance connected in series with the flow resistance of the filter chamber. Preferably the orifice of the orifice plate is so sized that, in case the flow resistance of the filter chamber falls below a normal level, choked flow is achieved in the orifice.

3 Claims, 4 Drawing Sheets

(56) References Cited

U.S. PATENT DOCUMENTS

| | | | | |
|---|---|---|---|---|
| 5,133,879 A | | 7/1992 | Tiittanen | |
| 5,470,473 A | * | 11/1995 | Park | B01D 33/073 210/402 |
| 5,540,846 A | * | 7/1996 | Koch | B01D 33/21 134/31 |
| 5,558,773 A | * | 9/1996 | Aigeldinger | B01D 25/007 210/180 |
| 5,589,079 A | * | 12/1996 | Park | B01D 33/073 210/391 |
| 5,643,468 A | * | 7/1997 | Ure | B01D 33/04 210/188 |
| 5,707,512 A | * | 1/1998 | Koch | B01D 33/21 210/136 |
| 5,762,786 A | * | 6/1998 | Oelbermann | B01D 25/164 100/194 |
| 5,925,258 A | * | 7/1999 | Pryor | B01D 29/118 100/121 |
| 6,071,425 A | * | 6/2000 | Vartiainen | B01D 25/1275 210/225 |
| 6,365,043 B1 | * | 4/2002 | Haberle | B01D 25/215 210/231 |
| 6,365,054 B1 | * | 4/2002 | Kruger | B01D 29/114 134/22.18 |
| 6,387,282 B1 | * | 5/2002 | Heckl | B01D 25/215 210/180 |
| 6,409,929 B2 | * | 6/2002 | Bott | B01D 33/073 210/177 |
| 6,439,273 B1 | * | 8/2002 | Kruger | B01D 29/114 141/11 |
| 7,396,472 B2 | * | 7/2008 | Duby | B01D 25/164 210/224 |
| 7,569,151 B2 | * | 8/2009 | Duby | B01D 25/164 210/224 |
| 7,736,502 B2 | * | 6/2010 | Marchek | B01D 25/215 210/231 |
| 7,815,808 B2 | * | 10/2010 | Benesi | B01D 29/09 100/110 |
| 7,988,868 B2 | * | 8/2011 | Mutzenberg | B01D 25/215 210/178 |
| 7,998,354 B2 | * | 8/2011 | Duby | B01D 25/164 210/224 |
| 8,022,338 B2 | * | 9/2011 | Kuffel | B01D 25/164 210/184 |
| 8,287,741 B2 | * | 10/2012 | Duby | B01D 25/164 210/224 |
| 8,366,928 B2 | * | 2/2013 | Duby | B01D 25/164 210/224 |
| 9,023,201 B2 | * | 5/2015 | Duby | B01D 25/164 210/224 |
| 2002/0038783 A1 | * | 4/2002 | Trotzki | B01D 29/114 210/407 |
| 2002/0158002 A1 | * | 10/2002 | Trotzki | B01D 29/114 210/332 |
| 2006/0027509 A1 | * | 2/2006 | Benesi | B01D 29/09 210/770 |
| 2006/0180553 A1 | * | 8/2006 | Pfeiffer | B01D 25/164 210/772 |
| 2009/0308817 A1 | * | 12/2009 | Mutzenberg | B01D 25/215 210/741 |
| 2015/0360149 A1 | * | 12/2015 | Suutari | B01D 25/284 210/771 |

FOREIGN PATENT DOCUMENTS

| | | |
|---|---|---|
| CN | 101406772 A | 4/2009 |
| CN | 102309876 A | 1/2012 |
| DE | 31 28 768 A1 | 2/1983 |
| DE | 195 21 555 A1 | 12/1996 |
| GB | 2091575 B | 8/1982 |
| GB | 2 264 882 A | 9/1993 |

OTHER PUBLICATIONS

International Preliminary Report on Patentability (PCT/IPEA/409) dated May 8, 2015, by the Finnish Patent Office as the International Searching Authority for International Application No. PCT/FI2014/050120.

Notification of the First Office Action issued by the Chinese Patent Office in corresponding Chinese Patent Application No. 201480010509.2 dated Mar. 4, 2016 (15 pages including partial English translation).

Finnish Search Report dated Nov. 8, 2013 of corresponding priority application No. 20131549.

* cited by examiner

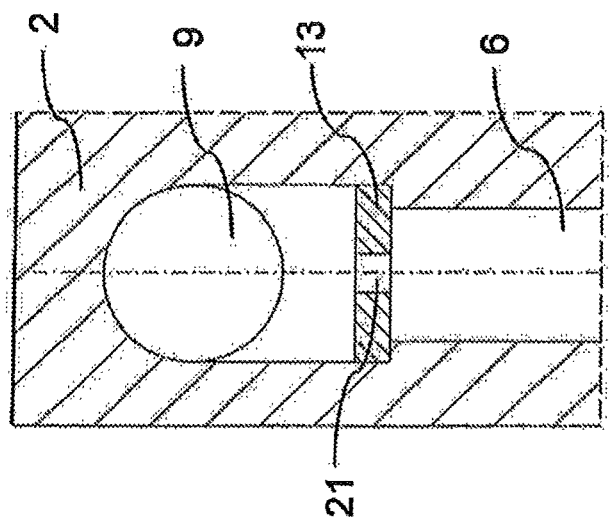
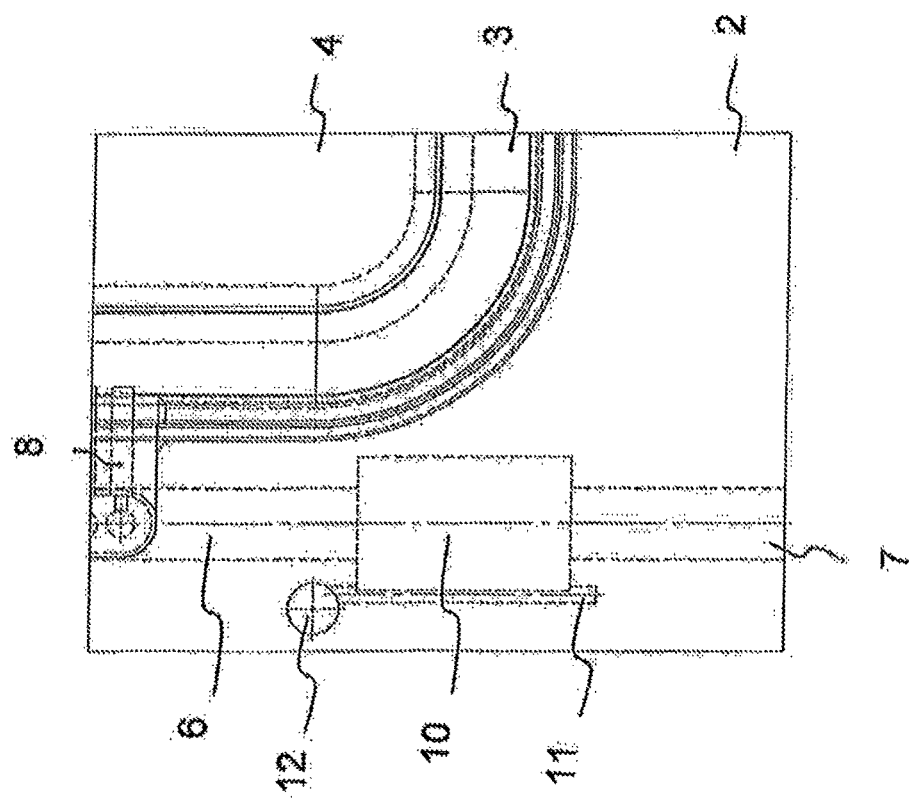

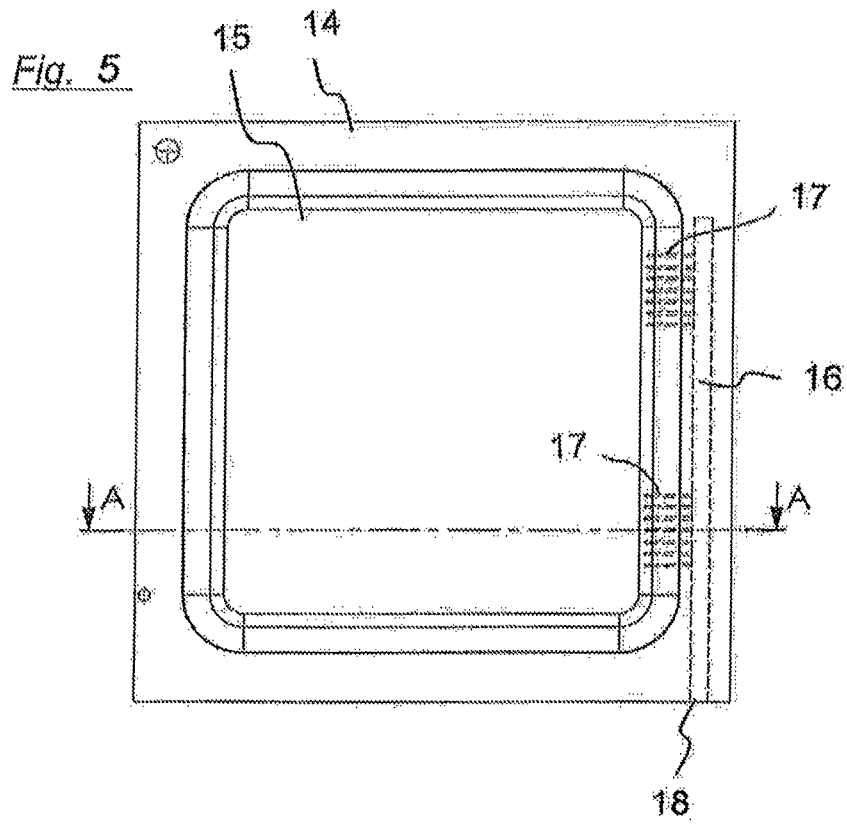
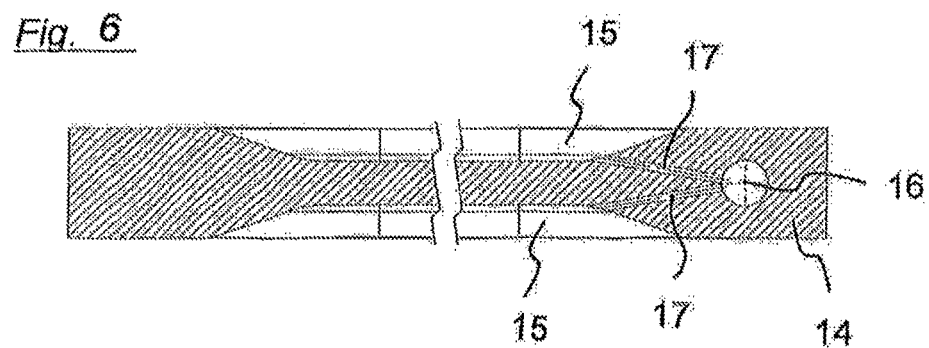

METHOD FOR AIR DRYING A FILTER CAKE AND FILTER PLATE

FIELD OF THE INVENTION

The invention relates to a method for air drying a filter cake contained in a filter chamber defined by a first filter plate, which comprises an air inlet for supplying drying air into the filter chamber to expel fluids from the filter cake, and a second filter plate, which comprises a fluid outlet for discharging fluids from the filter chamber.

The invention also relates to a filter plate for a filter press, comprising a recess for defining a filter chamber in co-operation with a corresponding recess of a contiguous filter plate and an air inlet for supplying drying air into the recess for air drying a filter cake contained in the filter chamber.

BACKGROUND OF THE INVENTION

Filter plates are used in filter presses for dewatering suspensions or slurries. In a filter press, a row of filter plates forms a solid plate pack of sealed filter chambers with two filter cloths in between each pair of plates. Process fluids are supplied to each filter chamber via one or more inlet channels and filtrate is discharged from each filter chamber via one or more outlet channels.

When starting a filtration cycle, the filter plates are first pressed tight against each other to seal the filter chambers. During a filling step, slurry to be dewatered is pumped via a slurry inlet channel into all filter chambers simultaneously. During a filtration step, solids are captured by the filter cloth to form a filter cake. At the same time, liquid penetrates through the filter cloth and the filtrate is drained from the filter chamber via one or more drainage outlets. A filter plate of a pressure filter can comprise an inflatable membrane. During a squeezing step, the membrane is inflated by pressurized medium, such as compressed air or pressurized water, to impose mechanical compression via the membrane on the filter cake, thus reducing the moisture content of the cake. During a washing step the filter cake is washed by impelling washing liquid to the cake and discharging the washing filtrate. During a drying step, compressed air is forced through the filter cake to achieve low residual moisture content before the filter cake is finally removed from the filter chamber.

The drying air is under pressure when it is fed into the filter chamber, where it pushes residual liquid through the filter cake. In the filter chamber, the pressure of the drying air reduces and the air expands.

Current filter plate packs are bearing the risk of unequal chamber conditions after the filtration step. The unequal conditions include inadequate thickness of the filter cake, uneven cake distribution in a single filter chamber, or uneven cake distribution over the plate pack length. This results in differences in air flow in individual chambers during the air drying step. Some chambers can take very high air flows because of total or partial short cuts. High air flow through a filter chamber causes a high risk of filter plate erosion and other damages.

PURPOSE OF THE INVENTION

The purpose of the invention is to eliminate the problems of prior art and to improve the reliability of filter cake air drying system.

One purpose is to eliminate the risk of damages caused by exceptional conditions in a filter chamber during the air drying of a filter cake.

Another purpose is to equalize the air flow into different filter chambers in a plate pack during the air drying of filter cakes.

SUMMARY

The invention relates to a method for air drying a filter cake contained in a filter chamber defined by a first filter plate, which comprises an air inlet for supplying drying air into the filter chamber to expel fluids from the filter cake, and a second filter plate, which comprises a fluid outlet for discharging fluids from the filter chamber. The method comprises throttling the air flow into the filter chamber by means of a flow regulating device contained in the first filter plate, which flow regulating device acts as a flow resistance connected in series with the flow resistance of the filter chamber.

According to one aspect of the invention, the flow regulating device is selected from a group comprising an orifice plate, an adjustable orifice plate, a throttle valve, and an adjustable valve.

According to another aspect of the invention, the orifice of the orifice plate is so sized that, in case the flow resistance of the filter chamber falls below a normal level, choked flow is achieved in the orifice.

According to another aspect of the invention, a fluid outlet contained in the first filter plate is blocked during the air drying. In that way the filter chamber is isolated from other filter chambers.

The invention also relates to a filter plate that comprises a recess for defining a filter chamber in co-operation with a corresponding recess in a contiguous filter plate and an air inlet for supplying drying air into the recess for air drying a filter cake contained in the filter chamber. The filter plate comprises a regulating device for regulating the air flow from the air inlet into the filter chamber, which regulating device acts as a flow resistance connected in series with the flow resistance of the filter chamber.

According to one aspect of the invention, the flow regulating device is selected from a group comprising an orifice plate, an adjustable orifice plate, a throttle valve, and an adjustable valve.

According to another aspect of the invention, the filter plate comprises at least one fluid outlet for discharging fluids from the filter chamber and a valve for blocking the fluid outlet during air drying of the filter cake.

According to one aspect of the invention, the orifice of the orifice plate is so sized that choked flow is achieved when the flow resistance of the filter chamber falls below a normal level. Also the cross-sectional area of the fluid outlet in the contiguous filter plate can be taken into account when sizing the orifice in the orifice plate. The dimensioning of the orifice can be done in such a way that even with none or just a minimal chamber pressure loss the total air flow is restricted to an acceptable value.

When the pressure upstream of the orifice plate is constant and the pressure downstream is gradually reduced, the pressure difference across the orifice plate grows, increasing both the gas velocity and the gas flow through the restriction. Eventually, as the downstream pressure is dropped further, the flow through the orifice plate becomes sonic. This is often referred to as choked flow, and it is a physical limit. Any further drop in the downstream pressure will not result in increase of gas flow. Once the flow becomes choked, it is independent of conditions downstream of the restriction.

Choked flow is useful in drying filter cakes in a filter press because the mass flow rate is independent of the downstream pressure, depending only on the temperature and pressure on the upstream side of the restriction. Under choked conditions, calibrated orifice plates can be used to produce a desired mass flow rate.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 3 is an enlarged view of detail B of FIG. 1.
FIG. 4 is an enlarged view of detail C of FIG. 1.
FIG. 5 is a top view of a chamber filter plate.
FIG. 6 is a sectional view of the chamber filter plate of FIG. 5 along a line A-A.

DETAILED DESCRIPTION OF EMBODIMENTS

A plate pack used in a filter press can be a mixed pack consisting of alternating membrane filter plates and chamber filter plates, or it can be a combi pack consisting of so called combi filter plates. The following description is based on a mixed pack construction, but the invention can as well be used in connection with combi filter plates, where the same filter plate comprises a membrane filter plate side and a chamber filter plate side.

Figure 1:
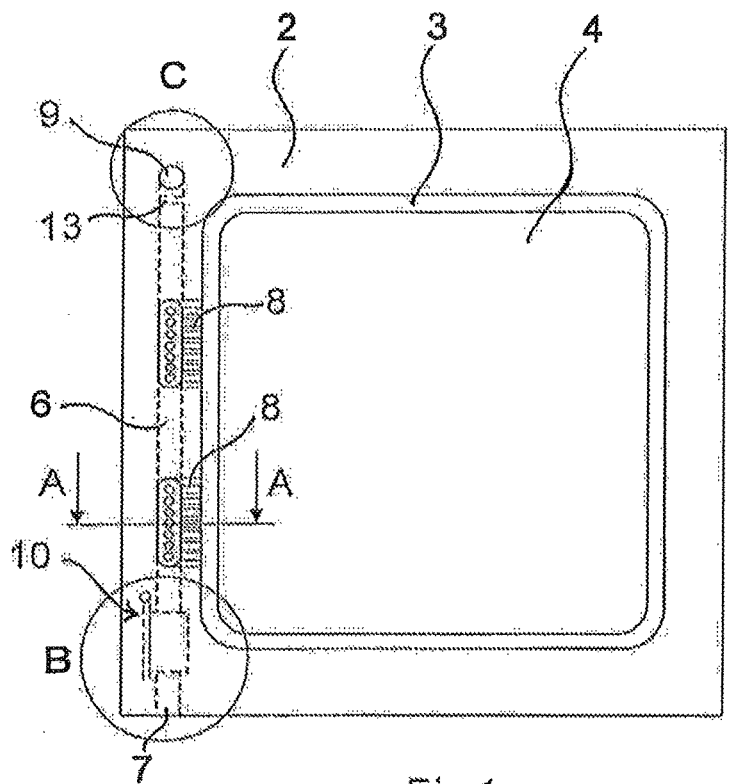
FIG. 1 is a top view of a membrane filter plate.
Figure 2:
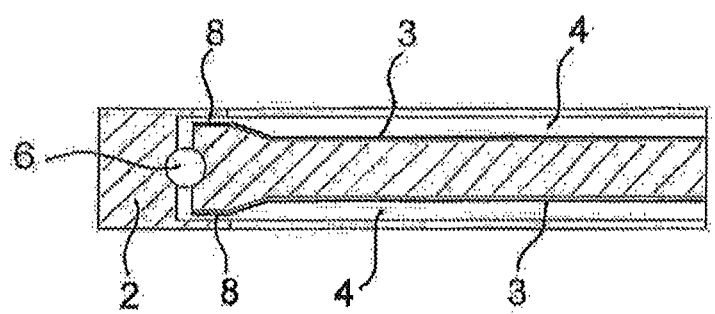
FIG. 2 is a sectional view of the membrane filter plate of FIG. 1 along a line A-A.

FIGS. 1 and 2 show a membrane filter plate 2 that comprises a recess 4 on both sides of the plate body and a flexible membrane 3 laying close to the bottom of the recess 4 so that an inflatable space is formed between the membrane 3 and the bottom of the recess 4. The frame of the membrane filter plate 2 is provided with a first fluid duct 6, which is connected to the recess 4 via a plurality of fluid conduits 8. The first fluid duct 6 can be connected alternatively to an air inlet 9 or to a first fluid outlet 7. The first fluid duct 6 is provided with an orifice plate 13 located downstream of the air inlet 9 and a block valve 10 located upstream of the first fluid outlet 7.

The orifice plate 13, which is shown in more detail in FIG. 4, comprises an orifice 21 for throttling air flow to the first fluid duct 6 and further to the recess 4.

The block valve 10 can be of any suitable type. One example of a possible block valve 10 is shown in detail in FIG. 3. The block valve 10 comprises a pneumatically driven membrane for opening and closing the connection between the first fluid duct 6 and the first fluid outlet 7. In this case, the membrane filter plate 2 also comprises a control conduit 11 and a through-hole 12 connected to the control conduit 11 for controlling the open and closed states of the block valve 10.

FIGS. 5 and 6 show a chamber filter plate 14, which comprises a recess 15 on both sides of the filter plate body. The frame of the chamber filter plate 14 is provided with a second fluid duct 16, which is connected to the recess 15 via a plurality of bore holes 17. At the other end of the second fluid duct 16 there is a second fluid outlet 18 for discharging fluids from the recess 15.

During the operation of a filter press, a membrane filter plate 2 and a chamber filter plate 14 are pressed together so that a filter chamber is defined by the recess 4 of the membrane filter plate 2 and the recess 15 of the chamber filter plate 14. The bottom of each recess 4, 15 is corrugated in one way or another. Two filter cloths are placed into the filter chamber and the slurry to be filtrated is fed in between the filter cloths via a feed shoe so that the slurry forces the filter clothes against the corrugated surfaces of the recesses 4, 15. These corrugated surfaces collect the filtrate permeating through the filter cloths. The solids of the slurry are retained between the filter cloths, forming a filter cake. The filtrate collected in the corrugated surfaces of the recesses 4, 15 is discharged via the first fluid outlet 7 in the membrane filter plate 2 and via the second fluid outlet 18 in the chamber filter plate 14.

To dry the filter cake contained in a filter chamber, pressurized air is fed via an air inlet 9, orifice plate 13, first fluid duct 6 and fluid conduits 8 to the recess 4 in the first filter plate 2. The drying air penetrates through the filter cake. The mixture of air and filtrate expelled from the filter cake is drained via the bore holes 17, second fluid duct 12 and second outlet 18 of the second filter plate 14. The orifice plate 13 acts as a flow resistance connected in series with the flow resistance of the filter chamber, throttling the air flow into the filter chamber.

Figure 7:
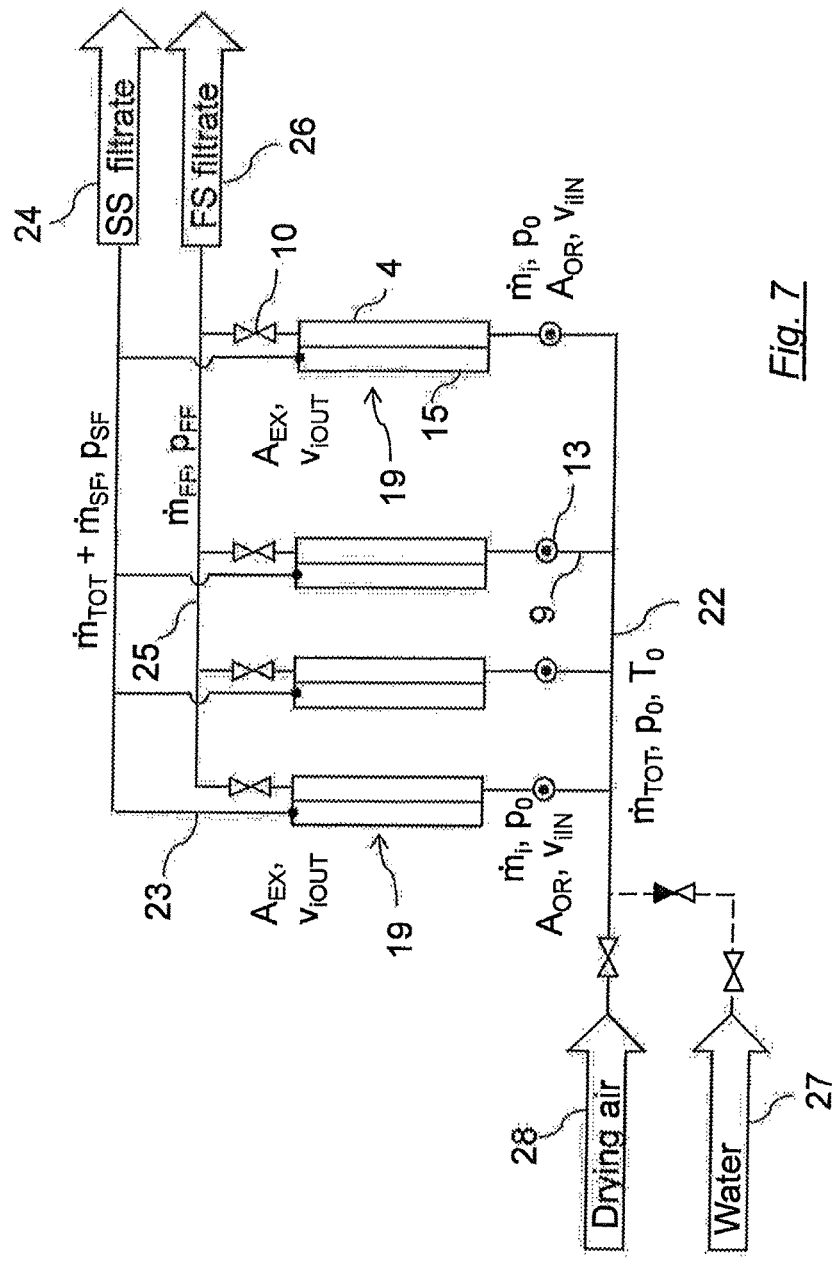
FIG. 7 is a schematic illustration of one embodiment of air drying system.

The principle of air drying with air throttling arranged in connection with each filter chamber will now be described with a view to FIG. 7. The filter pack comprises a plurality of filter chambers 19 defined by a first recess 4 of a first filter plate and a second recess 15 of a second filter plate. Each filter chamber 19 contains a filter cake that has been formed between two filter cloths during preceding filtration steps. The filter cake and the filter clothes together form the flow resistance of the filter chamber 19 during the air drying. Each first filter plate 2 comprises an orifice plate 13 for throttling the air flow into the filter chamber 19. Pressurized air is supplied from a drying air source 28 via an air supply line 22 to the air inlet 9 of the first filter plate 2. The first filter plate 2 also comprises a block valve 10 for blocking the connection between the first recess 4 and the first fluid outlet 7 during the air drying step. The drying air fed to the first recess 4 is forced through the filter cake, expelling filtrate from the filter cake to the second recess 15, which is connected via a second fluid outlet 18 and a second drainage line 23 to a chamber side filtrate collector 24. FIG. 7 also shows a first drainage line 25 for connecting the first fluid outlets 7 to a membrane side filtrate collector 26 during filtration steps.

The system may also comprise an optional water source 27 that can be connected to the air supply line 22 during the slurry feeding and cake squeezing steps. During these steps, small amounts of water can be fed via each air inlet 9 into each recess 4 to prevent contamination or blocking of the orifice plate 13 by the filtrate contained in the recess 4.

An explanation of the symbols to be used in the following description is given below:
$p_0$ is the absolute air pressure in the air supply line 22,
$\dot{m}_{TOT}$ is the total air mass flow of air supply line 22,
$T_0$ is the absolute temperature of the drying air feed,
$A_{OR}$ is the area of the orifice 21, which is similar in each plate 2,
$A_{EX}$ is the area of the air outlet opening 18 in the second plate 14, $v_{iIN}$ is the flow speed in the orifice 21,
$v_{iOUT}$ is the flow speed in the air outlet opening 18,
$\dot{m}_i$ is the mass flow through the orifice 21, and it is chamber specific,
$p_i$ is the drying air pressure in a filter chamber 19, and it is chamber specific,
$\dot{m}_{SF}$ is the mass flow of air and filtrate from the second recess 15,
$\dot{m}_{FF}$ is the mass flow of filtrate from the first recess 4,
$p_{SF}$ is the back pressure of the second filtrate collector 24,
$p_{FF}$ is the back pressure of the first filtrate collector 26,
$v_{CRIT}$ is the maximum flow velocity when erosion does not occur.

The air pressure $p_0$ in the air supply line 22 is selected based on the application and filter type in question. The drying air pressure $p_i$ in each chamber 19 is chamber specific. The chamber specific drying air pressure $p_i$ depends on the permeability of the filter cake and filter cloths, the area $A_{OR}$ of the orifice 21 in the orifice plate 13, the absolute pressure $p_0$ in the air supply line 22, the back pressure $p_{SF}$ in the second filtrate collector 24, the area $A_{EX}$ of the second fluid outlet 18, and the absolute temperature $T_0$ of the drying air feed. The area $A_{OR}$ of the orifice 21 is preferably similar in each plate 2. The permeability of the filter cake and filter clothes influence the flow resistance of the filter chamber 19.

During an ideal operation of the air drying system, the chamber specific drying air pressure $p_i$ is identical in each filter chamber 19. Also the air mass flow $\dot{m}_i$ into each filter chamber 19 is essentially the same. Occasionally, the flow resistance in one of the filter chambers can be different from the flow resistances in the other filter chambers in the filter pack. This results in a different drying air pressure $p_{iOUT}$ in the filter chamber in question.

Dimensioning of the cross-sectional area $A_{OR}$ of the orifice 21 is based on the fact that the flow velocity $v_{iIN}$ should be the same in each filter chamber 19 and that the flow speed $v_{iOUT}$ should always be smaller than the maximum flow velocity $v_{CRIT}$ in which erosion does not occur. If the flow velocity $v_{iOUT}$ in a filter chamber is higher than the critical velocity $v_{CRIT}$, there is a high risk of erosion in the parts 16, 17, 18 of the second filter plate 14 which get into contact with the increased air flow.

The idea of the present invention is to produce a choked flow phenomenon in a filter chamber in which the flow resistance is reduced for one reason or another. Such unusual conditions in a filter chamber include, for instance, broken filter cloths, missing, thin or uneven filter cake, etc. In the healthy chambers the chamber specific drying air pressures $p_{iOUT}$ are essentially identical, and the chamber specific mass flow $\dot{m}_i$ through each orifice plate 13 is essentially the same in each healthy chamber.

However, in a filter chamber with odd conditions, the chamber specific drying air pressure $p_{iOUT}$ is much the same as the back pressure $p_{SF}$ in the chamber side filtrate collector 24. The flow speed $v_{iIN}$ in the orifice plate 13 of the "sick" filter chamber is higher than the flow speed in the orifice plates of "healthy" filter chambers.

Choked flow occurs when the gas velocity across a restriction in a flow path becomes sonic. This is a maximum velocity which limits the gas flow. An orifice plate 13 is simply a plate with a hole 21 in it to restrict the air flow, resulting in a pressure drop. When the pressure downstream of the orifice plate is low enough, the air flow through the orifice plate 13 becomes sonic. This is often referred to as choked flow and it is a physical limit. Any further drop in the downstream pressure will not result in an increase in gas flow. Once the flow becomes choked, it is independent of conditions downstream of the restriction.

As there is a choked flow phenomenon in a sick filter chamber, flow speed $v_{iIN}$ in the orifice plate 13 of the filter chamber is essentially the same as the sonic speed, but it does not rise further. Having carefully determined the ratio of the area $A_{EX}$ of the fluid outlet opening 18 to the area $A_{OR}$ of the orifice 21, we still have a velocity $v_{iOUT}$ which is below the critical velocity $V_{CRIT}$. At the same time, the air mass flow $\dot{m}_i$ in healthy filter chambers is maintained on an effective level.

Fore-throttling is used to restrict the mass flow $\dot{m}_i$ of drying air by means of choked flow phenomenon to such a threshold below which the velocity $v_{iOUT}$ of the exiting air, which has expanded due to the pressure drop, does not cause serious erosion together with solid particles.

Throttling of drying air supply is feasible only when the filter chambers 19 can be kept separate from each other so that there is no pressure equalization route between individual filter chambers. In addition to the previously mentioned block valves 10 between the first recess 4 and the first drainage line 25, also filling shoes (not shown) or membranes can act as blocking elements that block the pressure equalization routes between individual filter chambers 19.

An orifice plate 13 installed in connection with an air supply inlet 9 acts as a serial flow resistance to the chamber flow resistance. As long as the chamber flow resistance is within a normal level, the flow resistance of the orifice 21 is adding up only a relatively small pressure loss to the overall resistance chain. In case the flow resistance in one or more chambers 19 reduces below a specified value, the air mass flow $m_i$ increases and the pressure loss over the orifice 21 increases correspondingly, resulting in a choked flow.

The invention allows remarkable increase in the operational safety of filter press operations.

A conventional solution would comprise controlling only the total air mass flow $\dot{m}_{TOT}$ from the air source 21 to the filter chambers 19 by means of a control valve, pressure transmitter, pressure reducer, orifice plate, etc. This kind of solution does not allow attending to disturbances in individual filter chambers. A filter plate pack may contain tens of filter chambers, in which case the eroding oversized air mass flow $\dot{m}_i$ into one filter chamber does not affect significantly the total air mass flow $\dot{m}_{TOT}$.

It is obvious to a person skilled in the art that with the advancement of technology, the basic idea of the invention may be implemented in various ways. The invention and its embodiments are thus not limited to the examples described above; instead they may vary within the scope of the claims. For instance, the orifice plate described above may be replaced with an adjustable orifice plate, a throttle valve, an adjustable valve, or any other suitable type of regulating device for regulating the air flow from the air inlet into the flow chamber.

The invention claimed is:

1. A method for air drying a filter cake contained between two filter cloths in a filter chamber defined by a first filter plate and a second filter plate, the first filter plate comprising an air inlet for supplying drying air into the filter chamber to expel fluids from the filter cake and a first fluid outlet for discharging fluids from the filter chamber, and the second filter plate comprising a second fluid outlet for discharging fluids from the filter chamber, wherein the method comprises:

performing air drying by supplying the drying air into the filter chamber;

blocking the first fluid outlet during the air drying, and throttling air flow into the filter chamber by means of a flow regulating device which is an orifice plate contained in the first filter plate, which orifice plate acts as a flow resistance connected in series with the flow resistance of the filter chamber, and an orifice of the orifice plate is so sized that, in case the flow resistance of the filter chamber falls below a predetermined level, choked flow is achieved in the orifice.

2. A filter plate for a filter press, comprising:

a recess for defining a filter chamber in co-operation with a corresponding recess in a contiguous filter plate, an air inlet for supplying drying air into the recesses for air drying a filter cake contained between two filter cloths in the filter chamber, and an orifice plate for regulating the air flow from the air inlet into the filter chamber, which orifice plate acts as a flow resistance connected in series with the flow resistance of the filter chamber, wherein the filter plate further comprises a fluid outlet for discharging fluids from the filter chamber and a valve for blocking the fluid outlet during air drying of the filter cake, wherein an orifice of the orifice plate is so sized that choked flow is achieved when the flow resistance of the filter chamber falls below a predetermined level, and wherein the orifice plate is disposed between the air inlet and the fluid outlet.

3. A filter plate according to claim 2, further comprising a flexible membrane laying adjacent a portion of the recess so that an inflatable space is formed between the flexible membrane and the portion of the recess.

* * * * *